United States Patent
Narita et al.

[11] Patent Number: 6,085,607
[45] Date of Patent: Jul. 11, 2000

[54] POWER TRANSMISSION DEVICE FOR VEHICLE

[75] Inventors: Satoru Narita; Yoshiaki Tsukada; Toshinari Mohara, all of Saitama, Japan

[73] Assignee: Honda Giken Kogyo Kabushiki Kaisha, Tokyo, Japan

[21] Appl. No.: 09/151,293

[22] Filed: Sep. 11, 1998

[30] Foreign Application Priority Data

Sep. 12, 1997 [JP] Japan ................................. 9-249055

[51] Int. Cl.⁷ ................................................ F16H 63/18
[52] U.S. Cl. .............................. 74/335; 74/337.5; 477/86; 192/3.56
[58] Field of Search ................................. 74/335, 337.5; 477/87; 192/3.56

[56] References Cited

U.S. PATENT DOCUMENTS

| | | |
|---|---|---|
| 4,930,081 | 5/1990 | Dunkley et al. .................. 74/335 X |
| 4,936,428 | 6/1990 | Leigh-Monstevens et al. ...... 477/87 X |
| 4,981,202 | 1/1991 | Leigh-Monstevens et al. . |
| 5,590,563 | 1/1997 | Kuwahata et al. .................. 74/337.5 |
| 5,809,836 | 9/1998 | Patzold et al. .................... 74/337.5 |
| 5,881,853 | 3/1999 | Peuster et al. .................... 74/335 X |

FOREIGN PATENT DOCUMENTS

| | | |
|---|---|---|
| 5-39865 | 2/1993 | Japan . |
| 2308874A | 7/1997 | United Kingdom . |
| 2323651A | 9/1998 | United Kingdom . |

*Primary Examiner*—Khoi Q. Ta
*Attorney, Agent, or Firm*—Birch, Stewart, Kolasch & Birch, LLP

[57] ABSTRACT

To perform simple and precise shift changes without using a change pedal and a change lever. In conjunction with the engagement and disengagement of a transmission clutch, a shift spindle rotates a shift drum to establish predetermined gear levels, and is rotatably driven via moderator gears by a motor. By operating a shift up switch or shift down switch not illustrated, the motor rotates the shift spindle in a prescribed direction, the transmission clutch and shift drum.

6 Claims, 13 Drawing Sheets

POWER TRANSMISSION DEVICE FOR VEHICLE

This application is related to commonly owned U.S. application Ser. No. 09/151,660 filed on Sep. 11, 1998.

BACKGROUND OF THE INVENTION

1. Field of the Invention

The present invention relates to a power transmission device for a vehicle equipped with a transmission provided between an engine and the drive wheels, and a transmission clutch provided between a power source and a transmission.

2. Description of Background Art

Generally, saddle ridden type vehicles are equipped with an integrated engine and a transmission power unit, whereby shift changes are performed by the foot of the rider operating the change pedal provided at the side of the transmission.

In addition, electric motor vehicles wherein a shift change is performed by intermittently revolving a transmission shift drum with a motor are described in Laid Open Patent Gazette No. Hei 5-39865.

However, in above mentioned conventional transmission devices which use change pedals, as the change pedal is operated by the foot of the rider, proficiency is required to perform fast shift changes and there is a limit to the reduction in the time required for shift changes even for proficient riders. Furthermore, as the transmission clutch is provided on the transmission and is operated by the change pedal, proficiency is required to smoothly engage the transmission clutch and suppress the occurrence of transmission shock. Also, as the change pedal always protrudes from the side of the transmission, problems exist such as the change pedal interfering with the floor board, and when attempting to confirm the upward and downward stroke of the change pedal, the transmission is underneath and the lowest road clearance is reduced, etc.

Also, as the transmission in the device stated in said Laid Open Patent Gazette No. Hei 5-39865 is not equipped with a transmission clutch, when performing a shift change, it is necessary to synchronize the drive-stop of the running motor and the drive of the shift change motor, so that not only is the control complicated, but in the case where the shift drum is unable to revolve smoothly, a lost motion mechanism is required to prevent excessive loads from being applied to the shift change motor.

SUMMARY AND OBJECTS OF THE INVENTION

Taking the aforesaid situation into account, it is the object of the present invention to provide a shift change which can be performed simply and precisely without proficiency in the operation being required.

In order to achieve the aforesaid object, a power transmission device for a vehicle equipped with a transmission is provided between an engine and a drive wheel and a transmission clutch provided between an engine and a transmission.

An electric activator is provided for performing the engagement and disengagement of the transmission clutch based on command signals from the operating member operated by the rider.

According to the above configuration, as the engagement and disengagement of the transmission clutch is provided between the power source and the transmission is performed by the electric activator, it is possible for an operator to perform simple and precise clutch operations without proficiency being required. In addition, rapid clutch operations which were previously impossible to perform directly with the hands and feet of the operator are now also possible to perform.

Further, in the present invention, the electric actuator is a motor capable of controlling forward and reverse rotation, and the motor is controlled so that the engagement speed slows with respect to the disconnection speed of the transmission clutch.

According to the above configuration, in conjunction with reducing the transmission time by quickly disengaging the transmission clutch, the transmission clutch is slowly engaged, enabling the transmission shock to be minimized.

Further, in the present invention, as well as engagement and disengagement of the transmission clutch, the motor also performs the transmission gear changes.

According to the above mentioned configuration, as the same motor is shared for the engagement and disengagement of the transmission clutch and transmission gear changes, the number of parts is reduced, thus contributing to cost reductions. Further, even if the drive speed of the motor is increased, as the timing of the engagement and disengagement of the transmission clutch and the timing of the gear change of the transmission are always synchronized, it is possible to perform smooth gear changes within a short time.

Moreover, in the present invention, the transmission is equipped with a gear column capable of establishing multiple gear levels, a shift fork for changing the mesh of the gear column, a shift drum for driving the shift fork, and a shift spindle for driving the shift drum. Here, the transmission clutch is engaged and disengaged by the rotation of the shift spindle and the motor is feed-back controlled based on the signals from a rotational phase detection means for detecting the rotational phase of the shift spindle.

According to the aforesaid configuration, as control of the transmission clutch and control of the transmission is performed using a common rotational phase detection means, the number of parts is reduced, thus contributing to cost reductions. Moreover, as the rotational phase detection means detects the rotational phase of the shift spindle near both the transmission shift drum and the transmission clutch that are to be controlled, it is possible to minimize detection errors.

In the present invention, the power transmission device for a vehicle is equipped with a transmission provided between an engine and the drive wheels and with a transmission clutch provided between an engine and a transmission. The transmission is equipped with a gear column capable of establishing multiple gear levels, a shift fork for changing the mesh of the gear column, a shift drum for driving the shift fork, and a shift spindle for driving the shift drum. The transmission clutch is engaged and disengaged by the shift spindle that is rotated by an electric actuator that is operated based on the command signals from the operating members operated by the rider.

According to the aforesaid configuration, as the engagement and disengagement of the transmission clutch provided between the power source and the transmission is performed by an electric actuator, it is possible for an operator to perform simple and precise clutch operations without proficiency being required. In addition, rapid clutch operations which were previously impossible to perform directly with the hands and feet of the operator are now also possible to perform.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
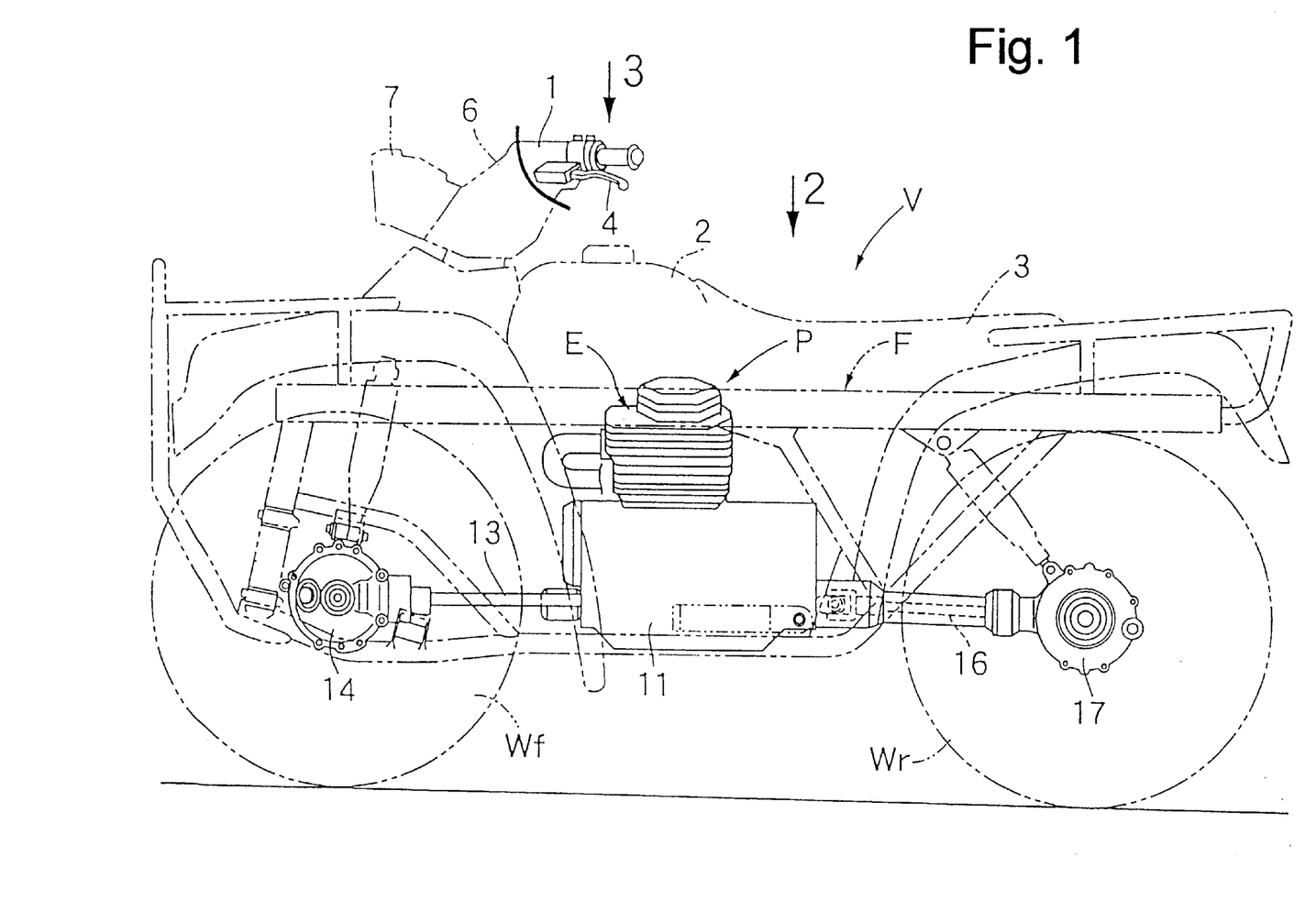
FIG. 1 is a side view of the left side of the saddle ridden type vehicle.
Figure 2:
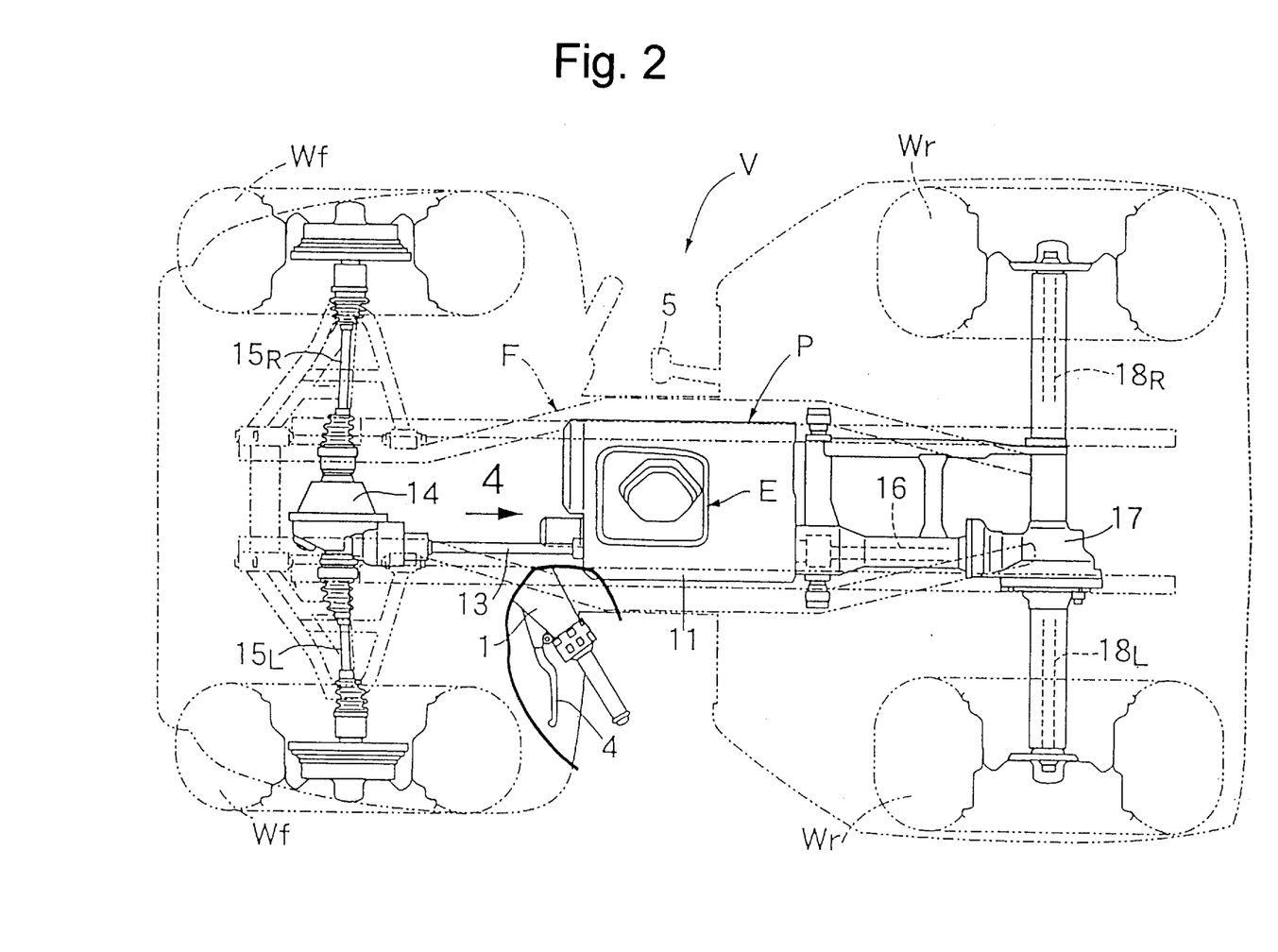
FIG. 2 is a plan view of the saddle ridden type vehicle taken in the direction of the arrow 2 illustrated in FIG. 1.

Below embodiments of the present invention are described based on the attached drawings wherein FIG. 1 to FIG. 12 show a first embodiment of the present invention. FIG. 1 and FIG. 2, illustrate a saddle ridden type vehicle V that is equipped with a vehicle body frame F assembled from welded steel tubes, to the front and back parts of which each of the left and right pair of front wheels Wf, Wf, and the left and right pair of rear wheels Wr, Wr are suspended. A handle 1, fuel tank 2 and straddle type seat 30 are arranged from the front on the upper part of a vehicle body frame F. A brake lever 4 is provided on the left end of handle 1, and a brake pedal 5 is provided on the right side of the central part of the vehicle body. Handle cover 6 covers the central part of steering handle 1 and meter 7 is provided so as to overhang in front thereof.

A power unit P is equipped with an engine E for driving left and right front wheels Wf, Wf and left and right rear wheels Wr, Wr. The power unit P is loaded on the central part of vehicle frame F below the fuel tank 2 and seat 3. The power unit P is equipped with casing 11 divided in two to the front and back combining the crank case and the mission case, and the crankshaft (see FIG. 4) supported by casing 11 is located in a lengthwise direction on the vehicle body.

A front propeller shaft 13 extending forwards from the power unit P is connected with the left and right parts of the front axle 15L, 15R via a front part differential 14. A rear propeller shaft 16 extending backwards from the power unit P is connected to the left and right parts of the rear axle 18L, 18R via rear differential 17 so that the four wheels Wr, Wf, Wr, Wr are driven.

As is clear from FIG. 3, a dimmer switch 22 for performing the upper and lower switching of the headlights, a lighting switch 23 for switching the head lights ON and OFF, a starting switch 24 for starting the engine E, a stop switch 25 for stopping the engine E, and a shift-up switch 26 and shift-down switch 27 for shifting transmission T up and down, to be described later, are provided near the left side grip 21 of handle 1. The shift-up switch 26 and shift-down switch 27 comprise the operating member of the present invention.

Figure 4:
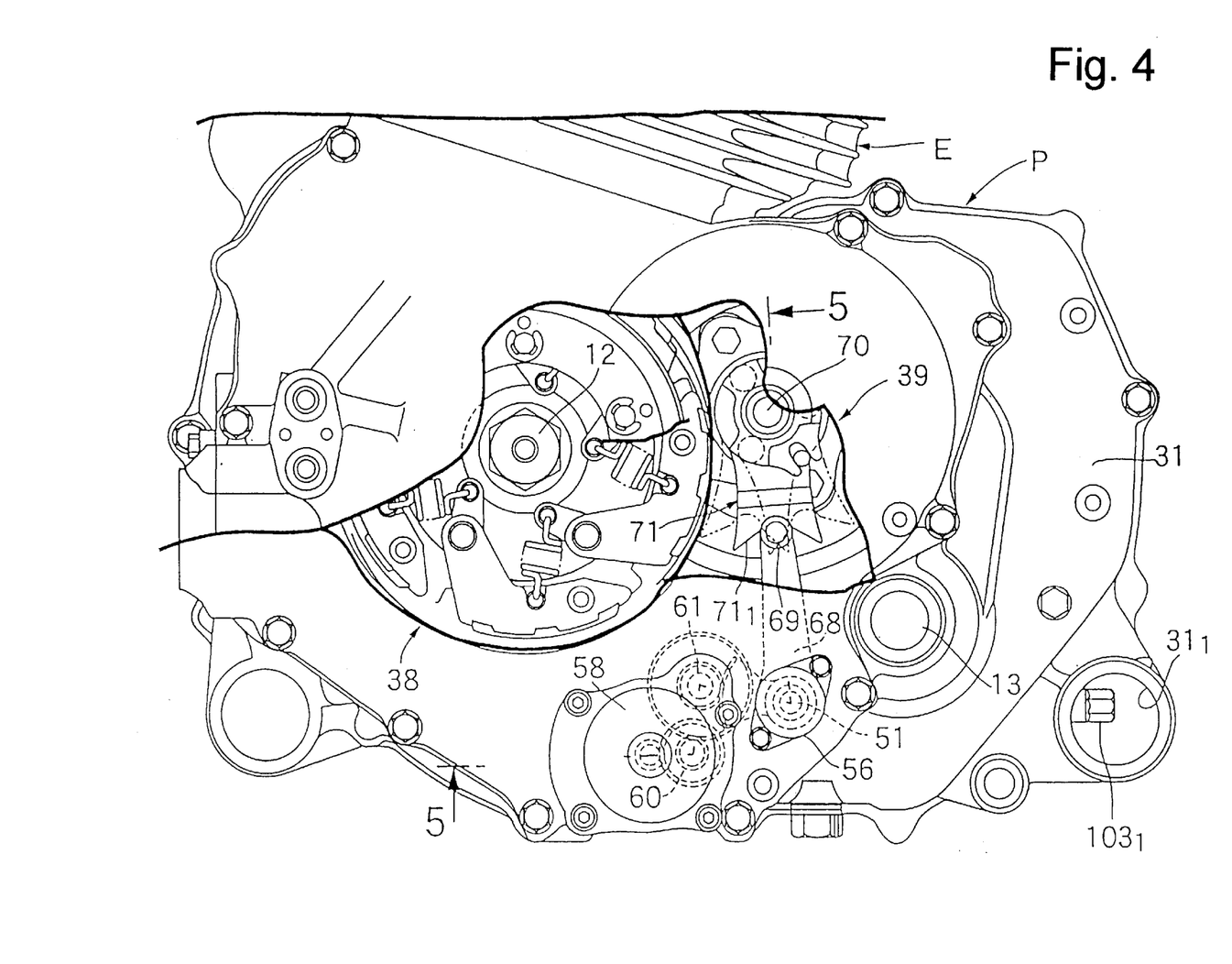
FIG. 4 is a partial enlarged view taken in the direction of arrow 4 of FIG. 2 of the power unit.
Figure 5:
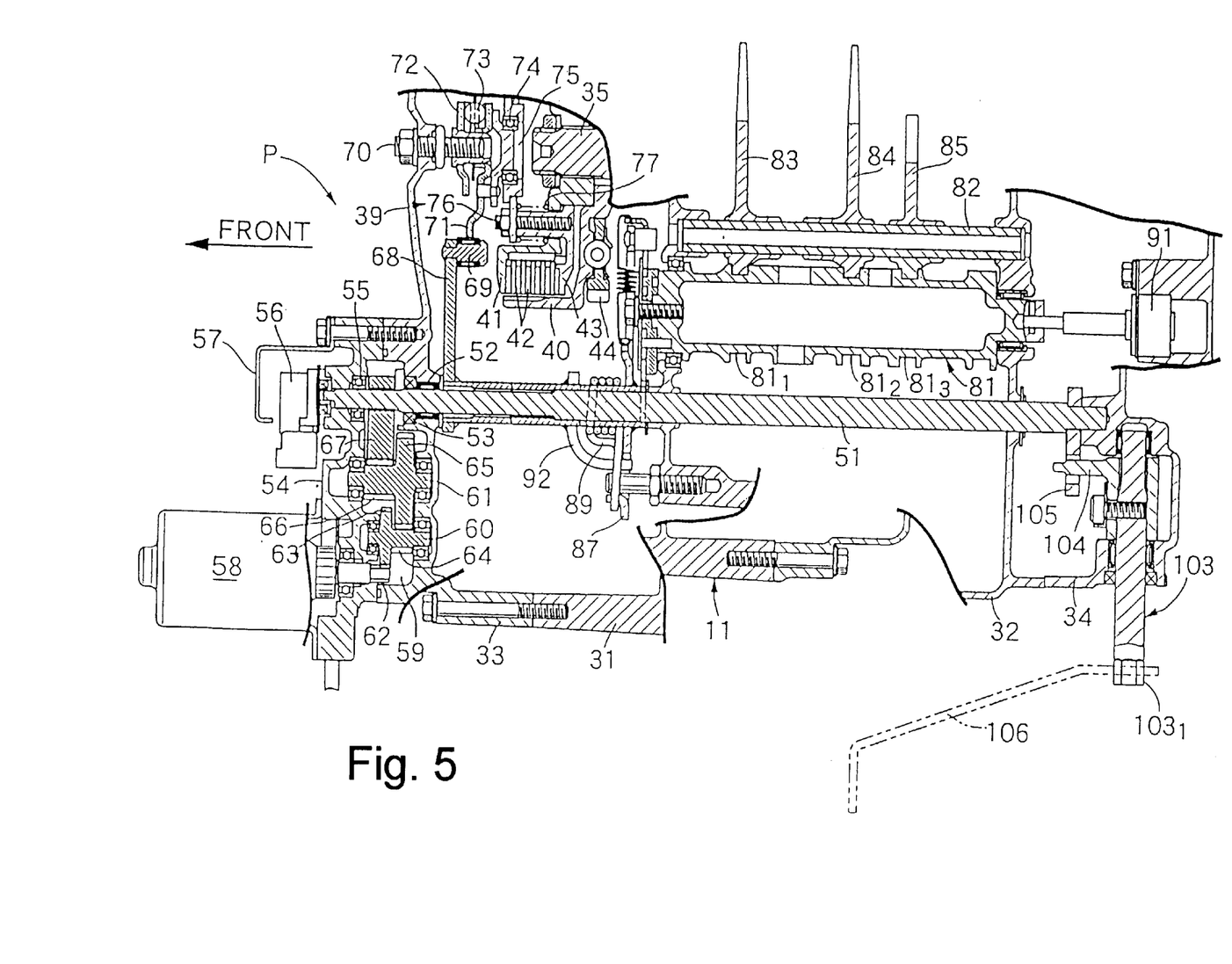
FIG. 5 is a cross sectional view along line 5—5 of FIG. 4.

Next, based on FIG. 4 to FIG. 8, the construction of the shift change device provided on power unit P is described. As shown in FIG. 5, the casing 11 of power unit P is constructed from front casing 31, rear casing 32 connected to the rear surface of this front casing 31, a front cover 33 connected to the front surface of the front casing 31, and rear cover 34 connected to the rear surface of the rear casing 32.

Figure 8:
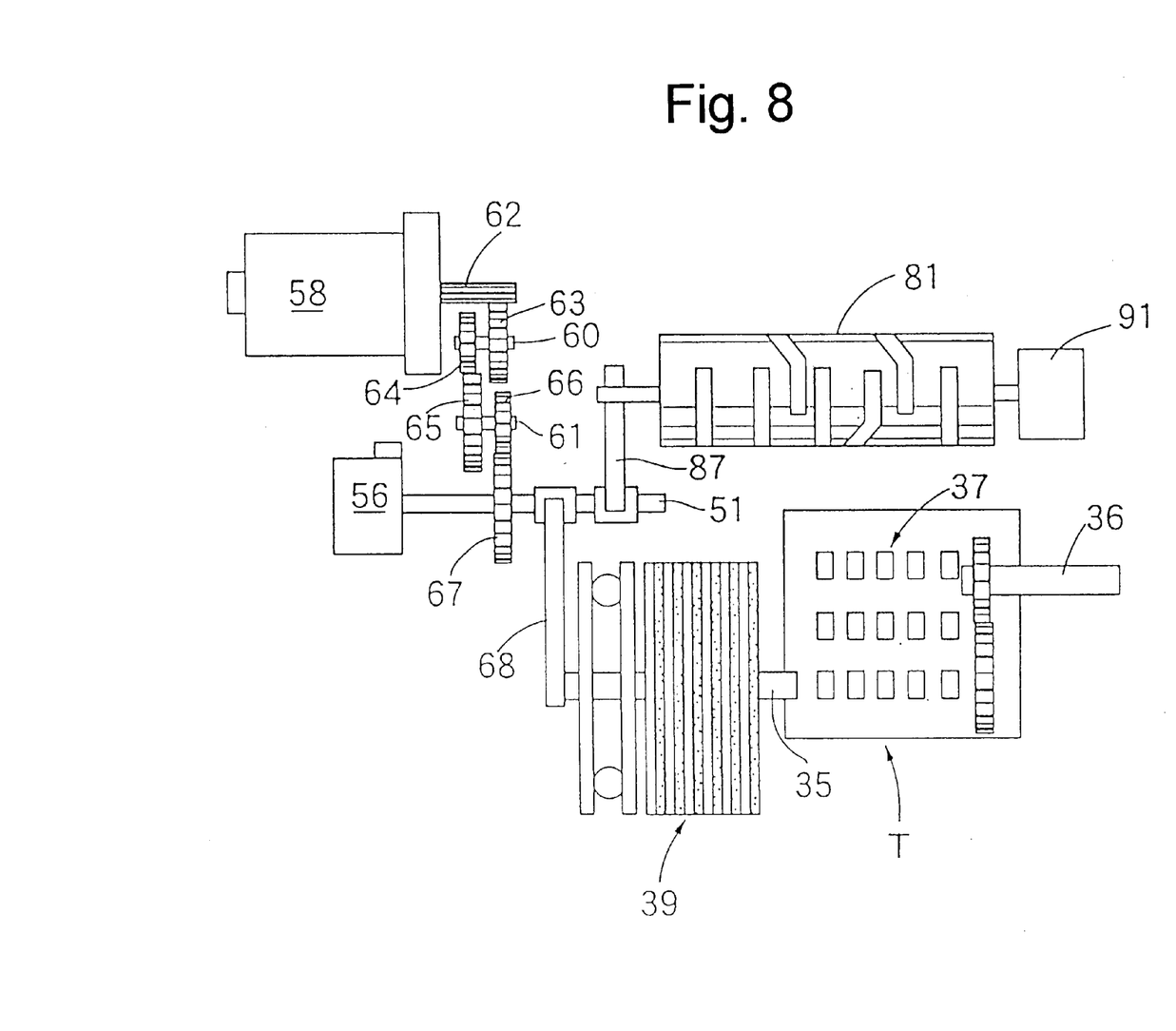
FIG. 8 is a skeleton drawing of the shift change device.

As schematically shown in FIG. 8, transmission T is housed in the inner part of power unit P and is equipped with a main shaft 35 connected to the crank shaft 12 (see FIG. 4) and a counter shaft 36 connected to a front propeller shaft 13 and a rear propeller shaft 16 (see FIG. 2). A gear column 37 for establishing multiple gear levels is provided between the main shaft 35 and the counter shaft 36.

As shown in FIG. 4, an accelerating clutch 38 formed from an automatic centrifugal clutch which automatically engages according to the increase in the number of engine revolutions is provided on the front end of crank shaft 12. A multi-disc type transmission clutch 39 connected and disconnected by said shift change device is provided on the front end of main shaft 35. A transmission clutch 39 is equipped with a clutch outer 40 supported so as to be relatively freely rotatable by the main shaft 35, a clutch inner 41 is fixed to the main shaft 35, a multiplicity of friction plates 42... are arranged between the clutch outer 40 and the clutch inner 41, and a clutch piston 43 is provided for pushing against the friction plates 42. The clutch outer 40 is connected to the crank shaft 12 via an input gear 44 connected as an integrated unit to the clutch outer 40.

A shaft spindle 51 extending in a length wise direction along the vehicle body is supported by the front cover 33, front casing 31, rear casing 32 and rear cover 34. The shift spindle 51 is supported by the front cover 33 via a needle bearing 52 and O ring 53. The front part of the shift spindle 51 further projects in a forward direction from front cover 32 and is supported by a gear case 54 connected to the front end of the front cover 33 via a ball bearing 55. Furthermore, the front end of the shift spindle 51 is connected to a rotational phase detection means 56 consisting of a potentiometer provided in the gear case 54. The outside of rotational phase detection means 56 is covered by protector 57 connected to gear case 54.

A motor 58 taken as an electric actuator is supported on the outside surface of the gear case 54. A first moderator shaft 60 and a second moderator shaft 61 are supported in a compartmentalized gear chamber 59 between the gear case 54 and the front cover 33. A first moderator gear 62 is provided on the output shaft of motor 58 and meshes with a second moderator gear 63 provided on the first moderator shaft 60. A third moderator gear 64 is provided on the first moderator shaft 60 and meshes with a forth moderator gear 65 provided on the second moderator shaft 61. A fifth moderator gear 66 is provided on the second moderator shaft 61 and meshes with a sixth moderator gear 67 formed from the sector gear provided on shift spindle 51. Therefore, by forward and reverse driving motor 58 it is possible to forward and reverse drive shift spindle 51. The second moderator gear 63 to the sixth moderator gear 67 are made from carbonized sintered metal.

A roller 69 provided on the tip of a clutch arm 68 fixed to shift spindle 51 engages with a groove $71_1$ of a movable cam plate 71 (See FIG. 4) pivotally supported by a spindle 70 provided on the front cover 33 arranged in an extended line from the main shaft 35. A plurality of balls 73 . . . are arranged between a fixed cam plate 72 connected to the spindle 70 and the movable cam plate 71. When the movable cam plate 71 revolves, the movable cam plate 71 moves in the center right direction in FIG. 5 due to the reactive force received via the balls 73 . . . from the fixed cam plate 72. A connecting plate 75 connected via a ball bearing 74 to the movable cam plate 71 is connected by a bolt 76 to the clutch piston 43. The connecting plate 75 is energized in the center left direction of FIG. 5 by a clutch spring 77 compressed between the clutch inner 41.

However, when the motor 58 is forward driven or reverse driven, the shift spindle 51 rotates forward and in reverse via moderator gears 62–67, and as the clutch arm 68 attached to the shift spindle 51 oscillates, the movable cam plate 71, pushed against groove $71_1$ by roller 69 provided on the tip clutch arm 68, also oscillates. As a result, movable cam plate 71 is moved by the reactive force received via ball 73 . . . from fixed cam plate 72, and as the connecting plate 75 connected to movable cam plate 71 moves clutch piston 43 in resistance to clutch spring 77 in the center right direction of FIG. 5, the friction plates 42 separate from each other and the connection of transmission clutch 39 is released.

Shift drum 81 and shift fork shaft 82 are supported in the lengthwise direction of the vehicle by front casing 31 and rear casing 32. Three cam grooves $81_1$ to $81_3$ are formed on the periphery of shift drum 81, and the bases of the three shift forks 83, 84, 85 engage with the cam grooves $81_1$ to $81_3$. When shift drum 81 revolves, shift forks 83, 84, 85 move in the shaft direction, and a predetermined gear change level is established via said gear column 37. The revolution position of the shift drum 81, namely, the shift position, is detected by a shift position detection means 91 consisting of a potentiometer attached to the rear end of the shift drum 81.

Figure 10:
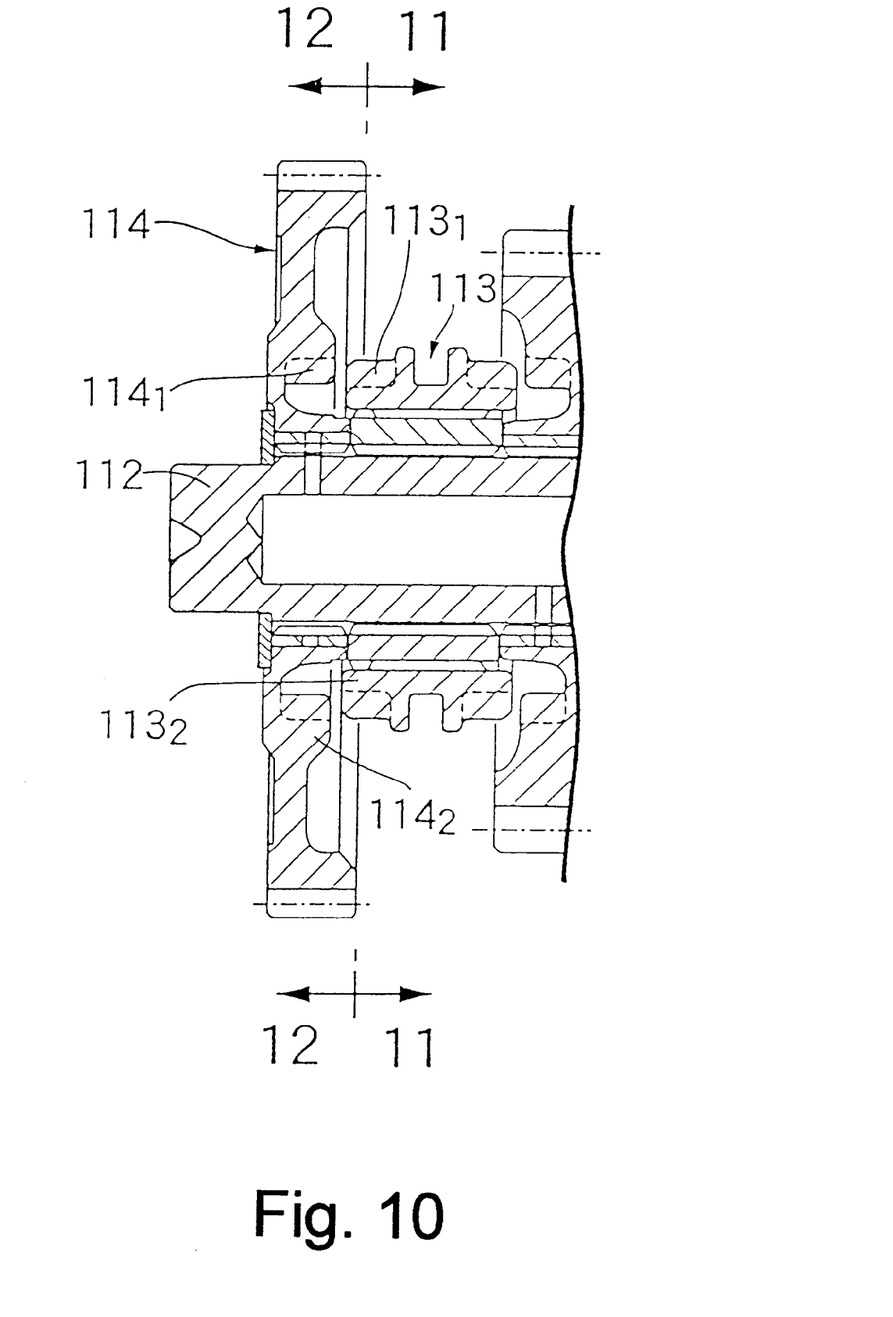
FIG. 10 is a partially enlarged drawing of the transmission.
Figure 11:
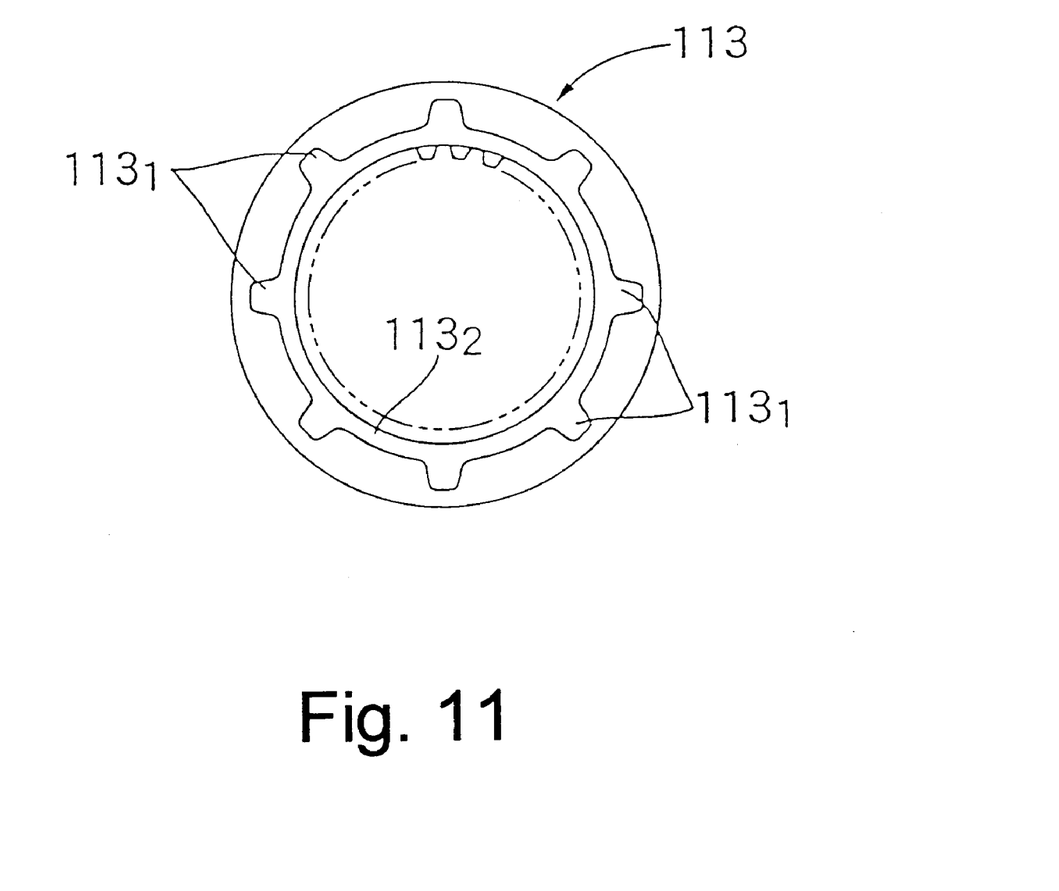
FIG. 11 is a view taken along line 11—11 of FIG. 10.
Figure 12:
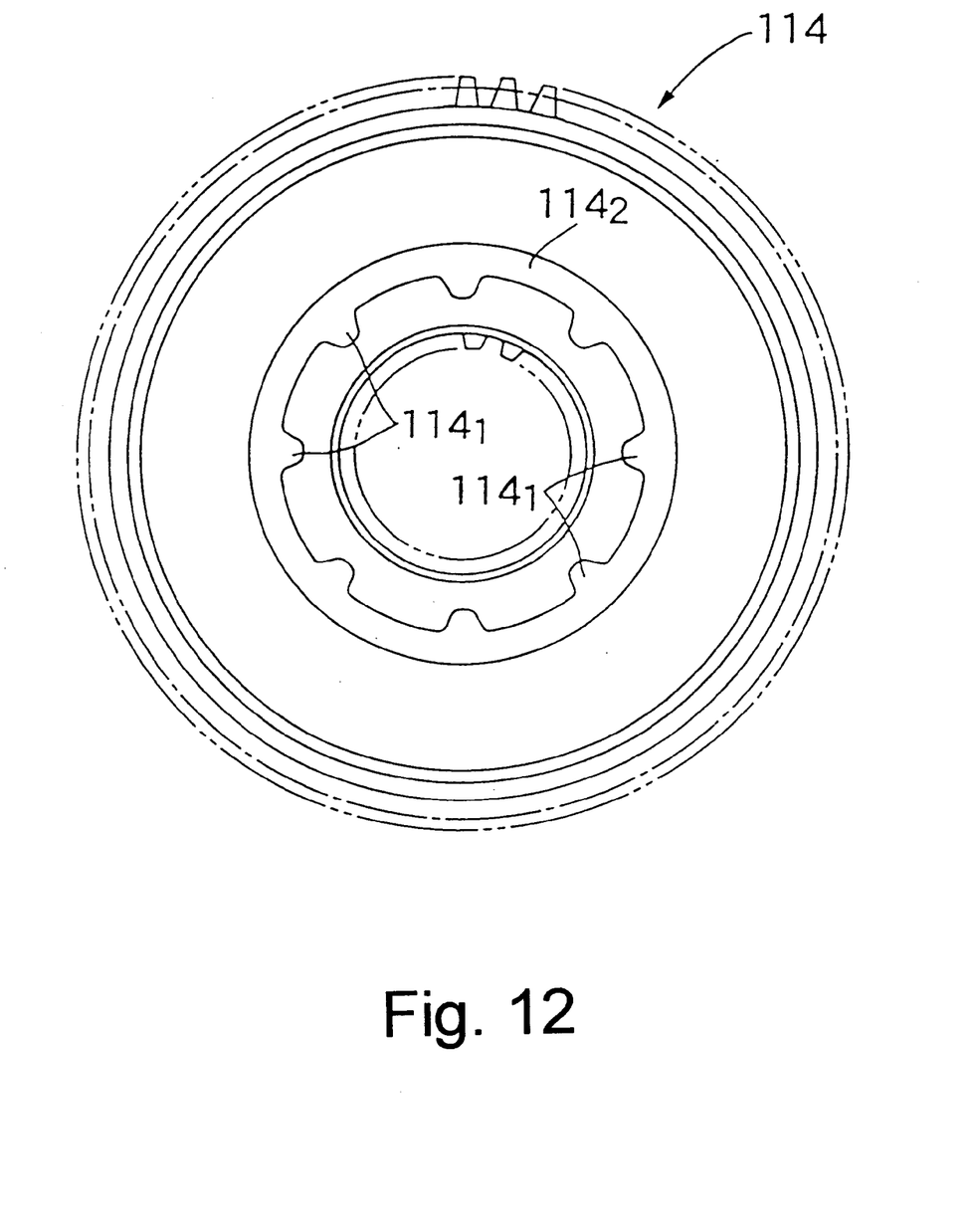
FIG. 12 is a view taken along line 12—12 of FIG. 10.

FIG. 10 to FIG. 12 show a shifter gear 113 driven by either of the shift forks 83, 84, 85 supported so as to be freely slidable by transmission shaft 112, and transmission gear 114 connected to the transmission shaft 112 by said shifter gear 113 supported so as to be relatively freely rotatable by the transmission shaft 112. Eight dogs $113_1$ . . . protrude evenly spaced around the circumference of the side of shifter gear 113, and the inside end of the radius of these dogs $113_1$ . . . are reinforced by being solidly connected to ring protrusion $113_2$. Also, eight dogs $114_1$ . . . capable of meshing with the 6 dogs $113_1$ of the shifter gear 113 protrude in an evenly spaced manner around the circumference of the side of the transmission gear 114. The outside end of the radius of the dogs $114_1$ . . . are reinforced by being solidly connected to ring protrusion $114_2$.

In order to increase the chances of shifter gear 113 and transmission gear 114 meshing and to reduce the time required for shift change, the dogs $113_1$ . . . , $114_1$ have been miniaturized. However, by reinforcing dogs $113_1$ . . . , $114_1$ using ring protrusions $113_2$, $114_2$, it has been possible to prevent strength being reduced due to the miniaturization of the dogs $113_1$ . . . , $114_1$. By doing this, it is possible to perform a precise shift change in a short period of time.

Figure 6:
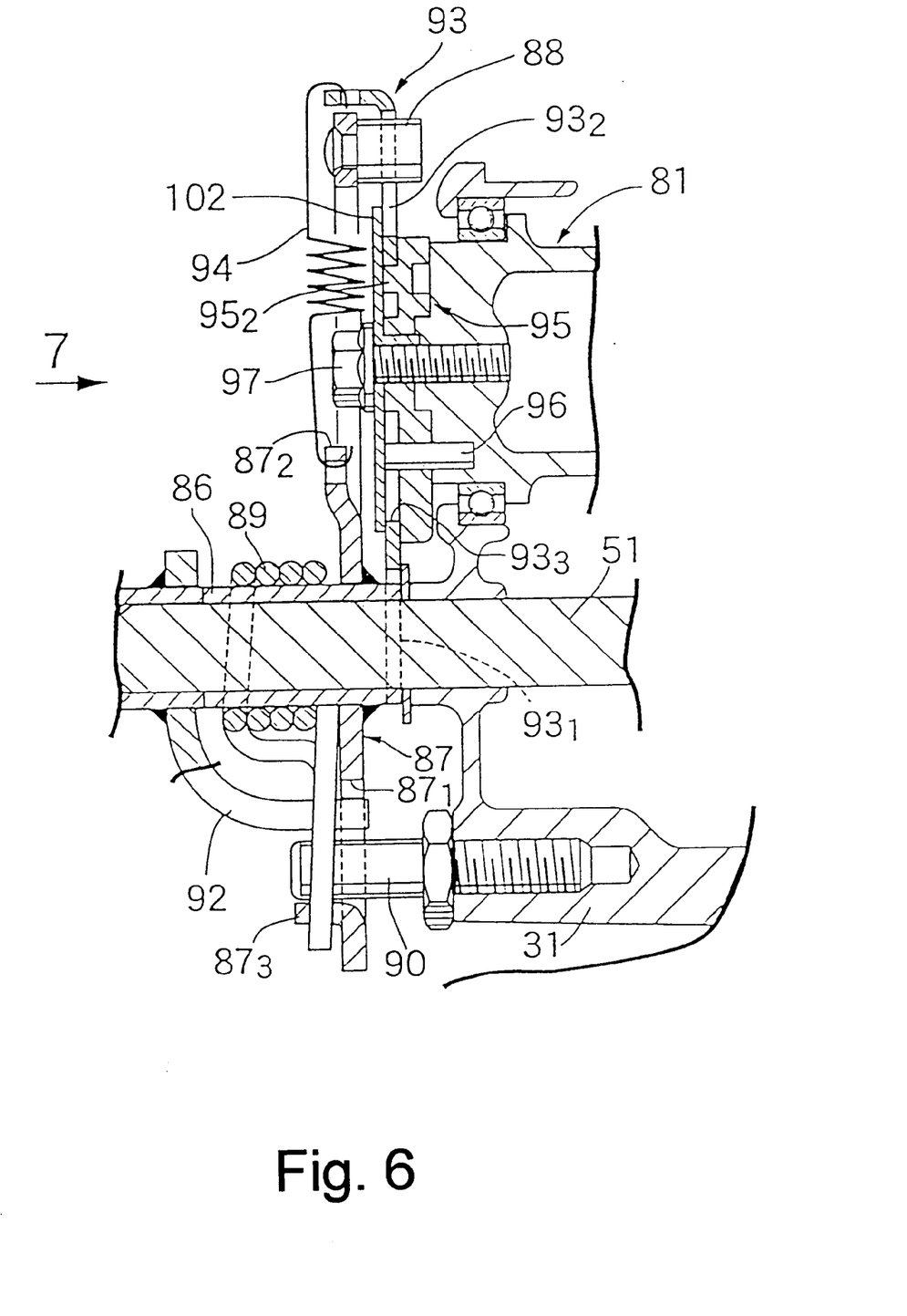
FIG. 6 is an enlarged view of the essential parts of FIG. 5.
Figure 7:
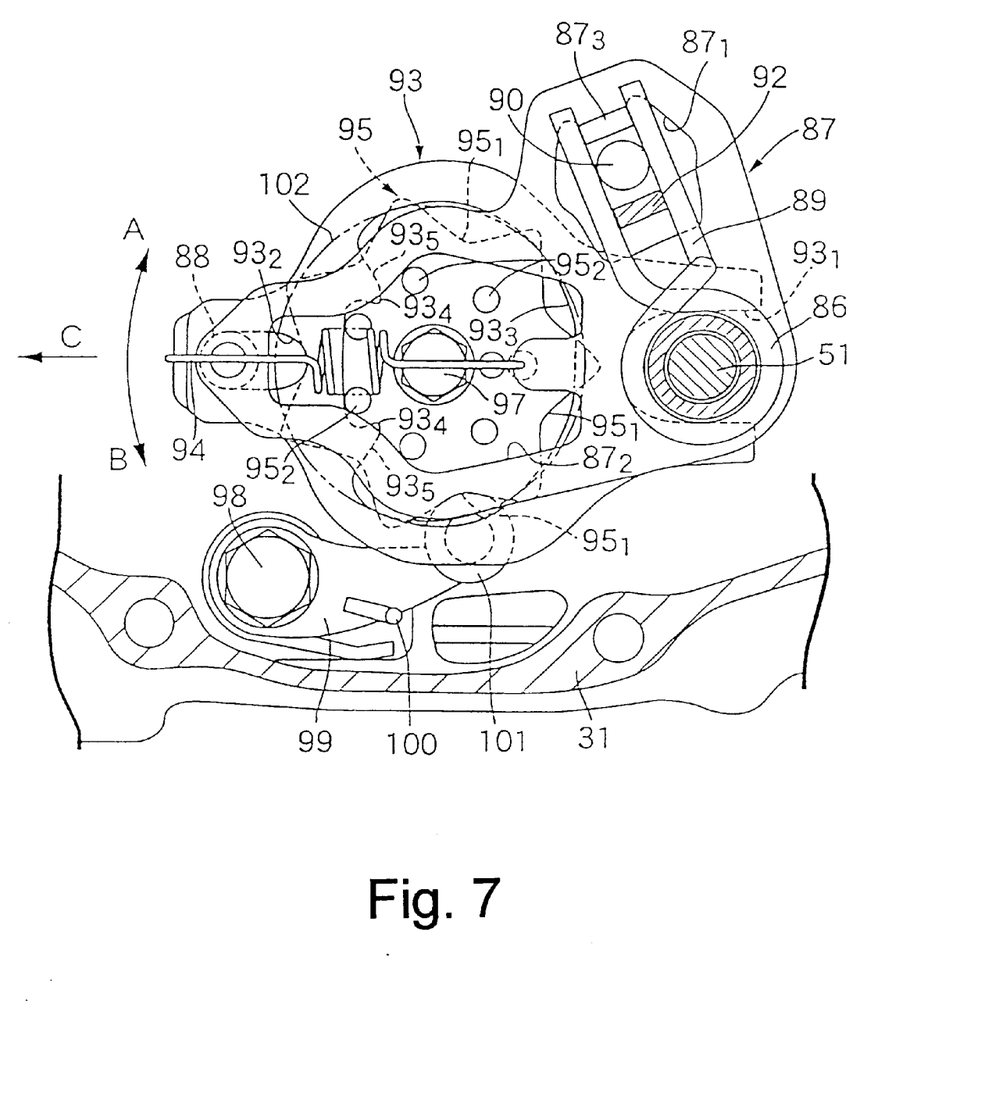
FIG. 7 is a plan view taken in the direction of arrow 7 of FIG. 6.

As is clear when FIG. 6 and FIG. 7 are referred to together, the base of change arm 87 equipped with a first opening part $87_1$, a second opening part $87_2$ and a spring receiver $87_3$, formed by bending the inner circumference edge part of a first opening part $87_1$, and a roller 88 is welded to collar 86 engaging so as to be relatively freely rotatable with the circumference of shift spindle 51. Both ends of a twist coil spring 89 supported by said collar 86 are screwed into the front casing 31 and engage with both side parts of a stud bolt 90 which loosely pass through the first opening part $87_1$ and both end parts of the spring receiver $87_3$ of the change arm 87. Therefore, when the change arm 87 is in a neutral position and oscillates in either direction to a position where the edge of the first opening part $87_1$ engages with the stud bolt 90, the spring receiver $87_3$ displaces the twist coil spring 89 and a force is generated to return the change arm 87 to the neutral position.

The tip of an L-shaped connecting arm 92 attached to shift spindle 51 extends inside the first opening $87_1$ of change arm 87 and is inserted in between both ends of said twist coil spring 89. Therefore, when shift spindle revolves in either a forward or reverse direction, the tip of connecting arm 92 slips only a predetermined distance inside the first opening part $87_1$ of change arm 87. When the tip engages with the internal edge of the first opening part $87_1$, the change arm 87 rotates in a forward/reverse direction. When the tip of connecting arm 92 is slipping, the change arm 87 remains stopped in a neutral position, and during that time the engagement of the transmission clutch 39 is released. Therefore, with predetermined timing from the disengagement of transmission clutch 39, it is possible to begin transmission operations with certainty.

Change plate 93 provided with a slot $93_1$ formed at one end, a long hole $93_2$ formed at the other end and an opening part $93_3$ formed in the middle is arranged between the end face of the shift drum 81 and the change arm 87. The change plate 93 is energized in a parallel direction to said slot $93_1$ and long hole $93_2$ by the spring 94 stretched between change arm 87, in a state where slot $93_1$ engages with the periphery of the collar 86, and long hole $93_2$ engages with the roller 88 of the change arm 87. In this state, the second opening part $87_2$ of change arm 87 and opening part $93_3$ of change plate 93 are arranged in a position so that they are substantially aligned.

A star shaped pin plate 95 is connected by a bolt 97 via a locating pin 96 to the end part of the shift drum 81. A detent arm 99 pivoted by a spindle 98 to the front casing 31 is energized by a spring 100, and a detent roller 101 provided on the tip of this detent arm 99 engages resiliently with either of seven concave parts $95_1$ . . . formed on the periphery of pin plate 95. Therefore, shift drum 81 is able to stop stably at either of 7 rotation positions corresponding to 7 shift positions.

Seven feed pins $95_2$ . . . are arranged at the periphery of the end surface of pin plate 95 in such a manner as to protrude, and a pair of protrusions $93_4$, $93_4$ capable of engaging with the feed pins $95_2$ . . . and the pair of cam faces $93_5$, $93_5$ are formed on the inner periphery of opening part 933 of the change plate 93. Furthermore, a plate shaped holder 102 pressing against the outer surface of change plate 93 is jointly fastened by said bolt 97 in order to prevent the change plate 93 from falling from the pin plate 95.

As shown in FIG. 5, on the rear cover 34, the secondary spindle 103 is supported orthogonally by the shift spindle 51, and an arm 104 connected to one end of a secondary spindle 103 engages with an arm 105 connected to the rear end of the shift spindle 51. A hexagonal part $103_1$ is formed on the other end of secondary spindle 103, and this hexagonal part $103_1$ faces the opening 311 of front casing 31 (See FIG. 4).

The torque of twist coil spring 89 energizing the shift spindle 51 to a neutral position is set greater than the sum of the frictional force of each moderator gear 62–67 and the motor 58 during extreme low temperatures (−25° C.). As the gear chamber 59 is lubricated with a small quantity of grease in order to reduce the frictional force of each of the moderator gears 62–67, if the motor 58 fails, the energizing force of twist coil 89 automatically returns the shift spindle 51 to a neutral position. Also, even if motor 58 fails, by engaging wrenches and other tools 106 (See FIG. 5) to the hexagonal part $103_1$ of secondary spindle 103, it is possible to manually operate the shift drum 81.

Assembly of the shift change device of the aforesaid construction is performed in the following order.

After inserting the shift spindle 51 from the rear with respect to the previously bolted front casing 31 and rear casing 32, the change arm 87, connecting arm 92 and clutch arm 68 are assembled to the shift spindle 51 from the front. Next, the rear cover 34 which has already been assembled with the secondary spindle 103 is bolted to the rear face of the rear casing 32. The front cover 33 which has previously been assembled with needle bearing 52 and O ring 53, etc., is bolted to the front face of front casing 31. Next, after assembling the first moderator shaft 60, the second moderator shaft 61 and the second moderator gear 63 to the sixth moderator gear 67 to the gear chamber 59 of the front face of front cover 33, the gear case 54 equipped with the integrated motor 58 and rotational phase detection means 56 is bolted so as to overlap the front face of front cover 33 together with protector 57.

The above mentioned shift change device is arranged in a lengthwise direction along the vehicle body so that the axis of shift spindle 51, shift drum 81 and motor 58 is parallel with the axis of crankshaft 12 of engine E, and as the entire shift change device is arranged concentrated below the area between crankshaft 12 and counter shaft 36 of transmission T, the efficient use of space makes it possible to miniaturize the power unit P. Also, as the motor 58 of the shift change device is arranged on the front face of the power unit P, it is possible to effectively cool the motor 58 with running air currents.

Figure 3:
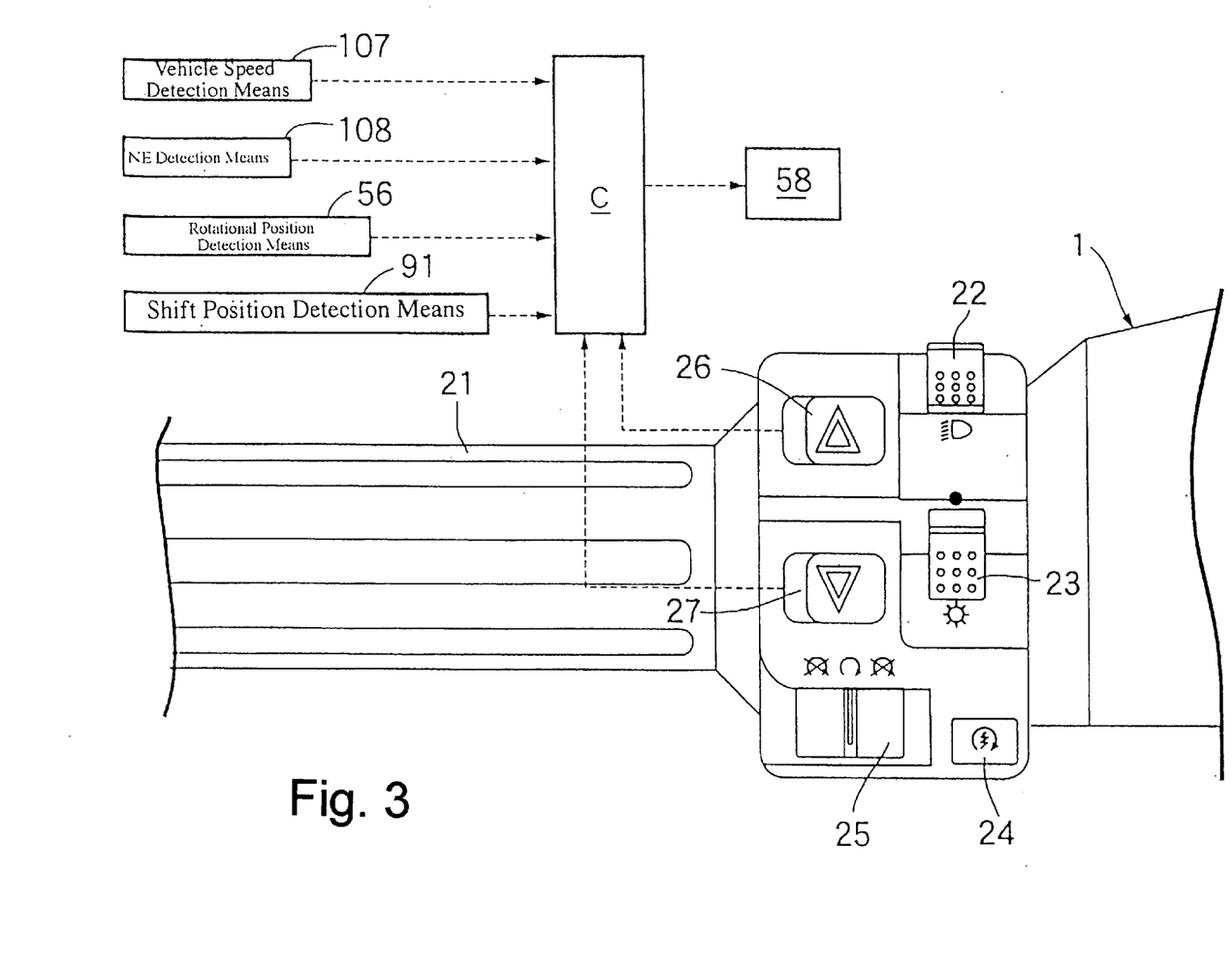
FIG. 3 is an enlarged plan view taken in the direction of arrow 3 in FIG. 1.

As shown in FIG. 3, in addition to signals from the shift up switch 26, shift down switch 27, revolving phase detection means 56 and position detection means 91, signals from vehicle speed detection means 107 and engine revolution detection means 108 are input to electronic control unit C, and the drive of motor 58 is controlled based on these signals.

Next, the operation of the embodiment is described. In the time chart of FIG. 9, when the shift up switch 26 or shift down switch 27 is operated at time t0, in the period until t1, the motor 58 is driven with a duty ratio of 100%. The drive direction of motor 58 at this time, that is to say, the direction of rotation of the shift spindle 51 is in the opposite direction in the case of shift up and in the case of shift down. When the angle of rotation of the shift spindle 51 reaches 6° 30', the transmission clutch 39 disengages, and the shift drum 81 begins revolving.

The following is a description of the operation at this time. In FIG. 7, when the change arm 87 revolves in the direction of arrow A, the change plate 93 connected via the roller 88 and long hole $93_2$ to this change arm 87 rotates in the direction of arrow A, and the under side protrusion $93_4$ formed by this opening part $93_3$ pushes against one feed pin $95_2$ in an upward direction so as to rotate the shift drum 81 in the direction of arrow A by one pitch. As a result, at time t2, when the angle of revolution of the shift spindle 51 reaches 19°, the detent roller 101 engages with a new concave part $95_1$ of the pin plate 95, and the shift drum 81 is stopped stably at a new position. Between time t1 and time t2, motor 58 produces a braking force and softens the impact of the inside edge of opening part $87_1$ of change arm 87 when engaging with stud bolt 90.

Figure 9:
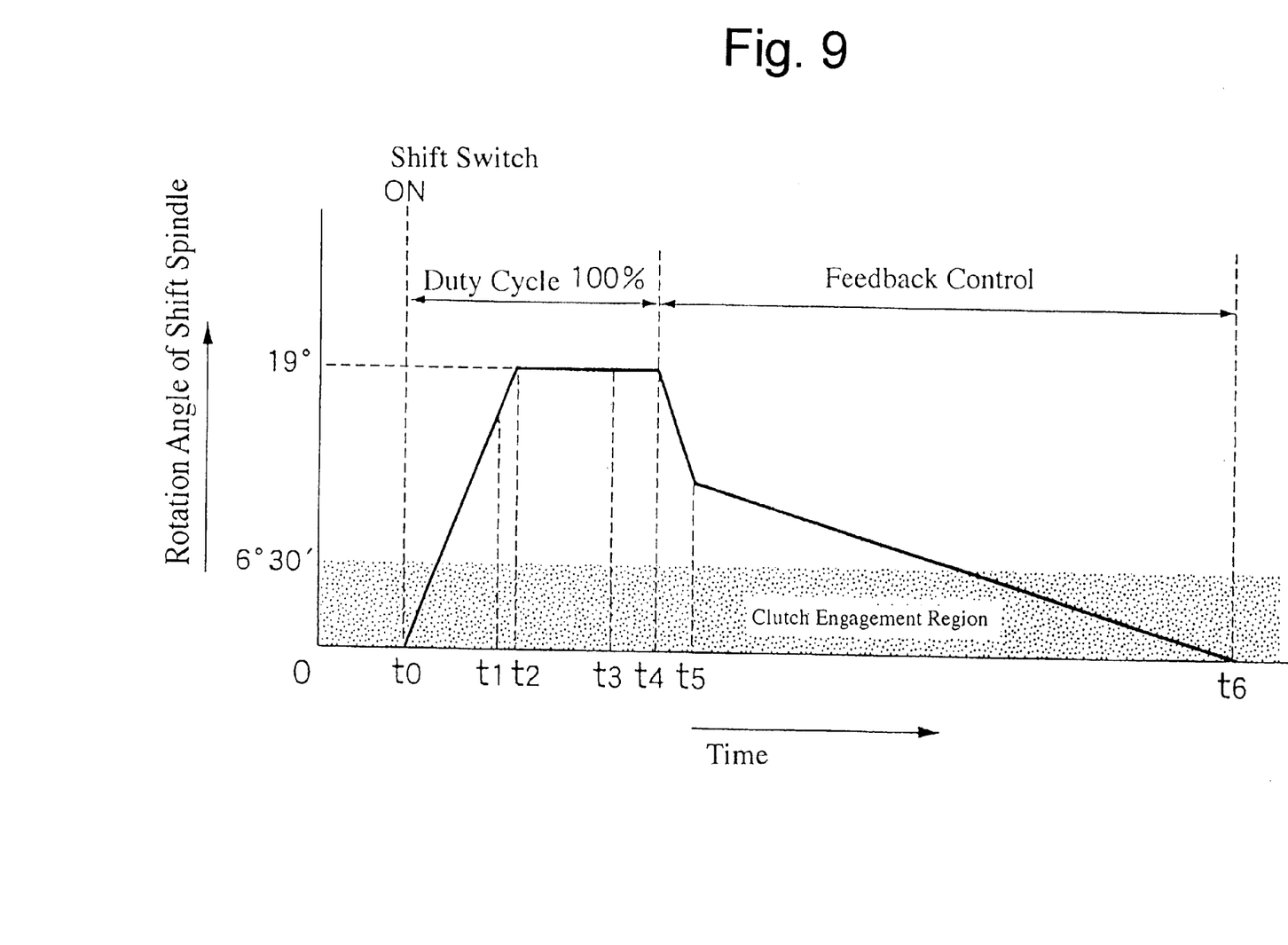
FIG. 9 is a time chart describing the operation.

Next, between time t2 and time t4, the revolution angle of the shift spindle 51 is maintained at 19°, and the shift change is completely ended. In the first half, the time between time t2 and time t3 is the time when the dog of the shifter gear driven by shift forks 81–83 is completely engaged with the dog of the transmission, and in the second half, between time t3 and time t4 is the time when throttle operation by the rider is permitted to reduce transmission shock.

Next, from time t4 to time t6, motor 58 is driven in a reverse direction. As a result, in FIG. 7, change arm 87 revolves in the direction of arrow B towards a neutral position, and change plate 93 together with change arm 87 revolves in the direction of arrow B, however, as the under side cam face $93_5$ formed by the opening part $93_3$ engages with one feed pin and receives a reactive force, the change plate 93 moves in the direction of arrow C due to this reaction force while causing the spring 94 to extend. As a result, the cam $93_5$ overrides the feed pin $95_2$ and while the stopping shift drum 81 in said new position, it is possible for change arm 87 and change plate 93 to return to a neutral position.

During this time, transmission clutch 39 is again engaged. However, during the time from t5 to time t6 when transmission clutch 39 is engaged, the drive speed of motor 58 is reduced. As a result, it is possible to prevent the occurrence of transmission shock by slowly engaging the transmission clutch 39.

Furthermore, when the number of engine revolutions detected by engine revolution speed detection means 108 exceeds a predetermined value (for example 3000 rpm), or the vehicle speed detected by vehicle speed detection means 107 is above a predetermined value (for example 10 km/h), in order that a sudden load is not placed upon the engine E, neutral to first gear, and neutral to reverse gear is prohibited. Also, when vehicle speed detected by the vehicle speed detection means 107 exceeds a predetermined value, (for example 3 km/h), in order to prevent an interruption of the drive force, a shift change from first gear to neutral is prohibited.

As in the above, in the first half of the shift change, the motor 58 is driven at a duty ratio of 100% and the transmission clutch 39 is quickly disengaged, enabling the time required for the shift change to be reduced. Also, in the second half of the shift change, by feedback controlling the revolution angle of shift spindle 51 based on the signals from revolving phase detection means 56, in addition for it to be possible to minutely control the revolution angle of the shift spindle, it is also possible to prevent the occurrence of transmission shock by setting the disengagement speed of the transmission clutch slower than the engagement speed.

However, instead of the change pedal and the change lever, by operating using only the shift up switch 26 or the shift down switch 27, as a shift change can be performed with the drive force of motor 58, a smooth shift change can be performed in a short time without requiring proficiency. Furthermore, as the same motor 58 and the same rotational phase detection means 56 are jointly used in the operation of the transmission clutch 39 and the operation of the transmission T, the number of parts is reduced, thus contributing to cost reductions. In this case, as the rotational phase detection means 56 detects the rotational phase of the shift spindle 51 near both driven members driven by the motor 58, namely, the clutch arm 68 and change arm 87, high precision operations are possible.

Figure 13:
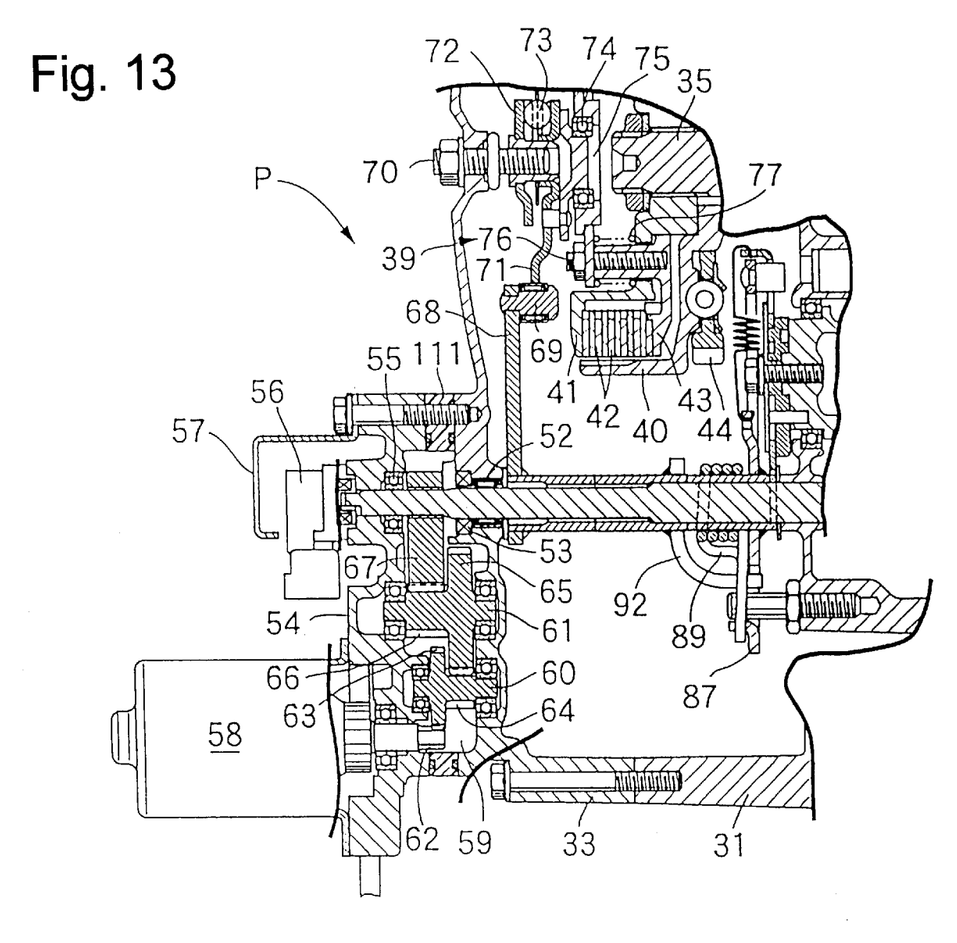
FIG. 13 is a drawing corresponding to said FIG. 5, and relating to a second embodiment of the present invention.

FIG. 13 shows the second embodiment of the present invention. In this second embodiment, as a heat insulator 111 made from bakelite intervenes between the front cover 33 and the gear case 54, it is possible to prevent the heat from the engine E from being transferred to the motor 58 and the rotational phase detection means 56 by using this heat insulator 111. Also, as the inside of gear case 54, in both the first embodiment and the second embodiment, is lubricated by a small quantity of grease, the insulation from heat from engine E is further enhanced.

In the above, details of the embodiments of the present invention have been given, however, various design modifications are possible without deviating from the scope of the essence of the present invention.

For example, the embodiment shows a four-wheeled saddle ridden type vehicle V. However, it is also possible to apply the present invention to two and three wheeled vehicles.

According to the present invention, as the connection and disconnection of the transmission clutch provided between a drive source and a transmission is performed by an actuator, a simple and precise clutch operation can be performed by anyone without extensive training or experience, and it is possible to perform a rapid clutch operation that would be impossible in the case where it is directly performed with the operator's hands or feet.

Also, according to the present invention, in conjunction with rapidly performing the transmission clutch disconnection reducing the transmission time, it is possible to slowly engage the transmission clutch, minimizing transmission shock.

Also, according to the present invention, as the same motor is used to engage or disengage the transmission clutch and change gears of the transmission, the number of parts is reduced, thus contributing to possible cost reductions. Also, even if the drive speed of the motor is increased, as the timing of the engagement and disengagement of the transmission clutch and the timing of the gear change of the transmission is always simultaneous, it is possible to perform smooth gear changes in a short time.

Also, according to the present invention, as the control of the transmission and the control of the clutch is performed using a common rotational phase detection means, part numbers are reduced, contributing to possible cost reductions. Furthermore, as the rotational phase detection means detects the rotational phase near to both controlled systems, namely the transmission shift drawing and the transmission clutch, it is possible to minimize detection errors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission device for a vehicle, equipped with a transmission provided between an engine and drive wheels and a transmission clutch provided between the engine and the transmission, comprising:

an electric actuator for controlling engagement of said transmission clutch based on command signals from manually actuated operating members, wherein said electric actuator is a motor capable of rotating in a forward and reverse direction, said motor being controlled such than an engagement speed of said transmission clutch is slower than a disengagement speed of said transmission clutch.

2. The power transmission device for a vehicle according to claim 1, wherein said motor controls engagement and disengagement of said transmission clutch, and also controls gear changes of said transmission.

3. The power transmission device for a vehicle according to claim 2, wherein said transmission is equipped with a gear column capable of establishing multiple gear levels, shift forks for changing meshing of the gear column, a shift drum for driving the shift forks, and a shift spindle for driving the shift drum, said transmission clutch being engaged and disengaged by rotation of said shift spindle and said motor being feed back controlled based on signals from rotational phase detection means for detecting rotational phase of said shift spindle.

4. A power transmission device for a vehicle comprising:

a transmission operatively connected to a power source;

drive wheels operatively connected to said transmission;

a transmission clutch provided between the power source and the transmission; and an electric actuator for controlling engagement of said transmission clutch based on command signals from manually actuated operating members, wherein said electric actuator is a motor capable of rotating in a forward and reverse direction, said motor being controlled such that an engagement speed of said transmission clutch is slower than a disengagement speed of said transmission clutch.

5. The power transmission device for a vehicle according to claims 4, wherein said motor controls engagement and disengagement of said transmission clutch, and also controls gear changes of said transmission.

6. The power transmission device for a vehicle according to claim 5, wherein said transmission is equipped with a gear column capable of establishing multiple gear levels, shift forks for changing meshing of the gear column, a shift drum for driving the shift forks, and a shift spindle for driving the shift drum, said transmission clutch being engaged and disengaged by rotation of said shift spindle and said motor being feed back controlled based on signals from rotational phase detection means for detecting rotational phase of said shift spindle.

\* \* \* \* \*